(No Model.) 2 Sheets—Sheet 1.
J. J. FAULKNER.
COTTON SEED HULLER.
No. 456,506. Patented July 21, 1891.
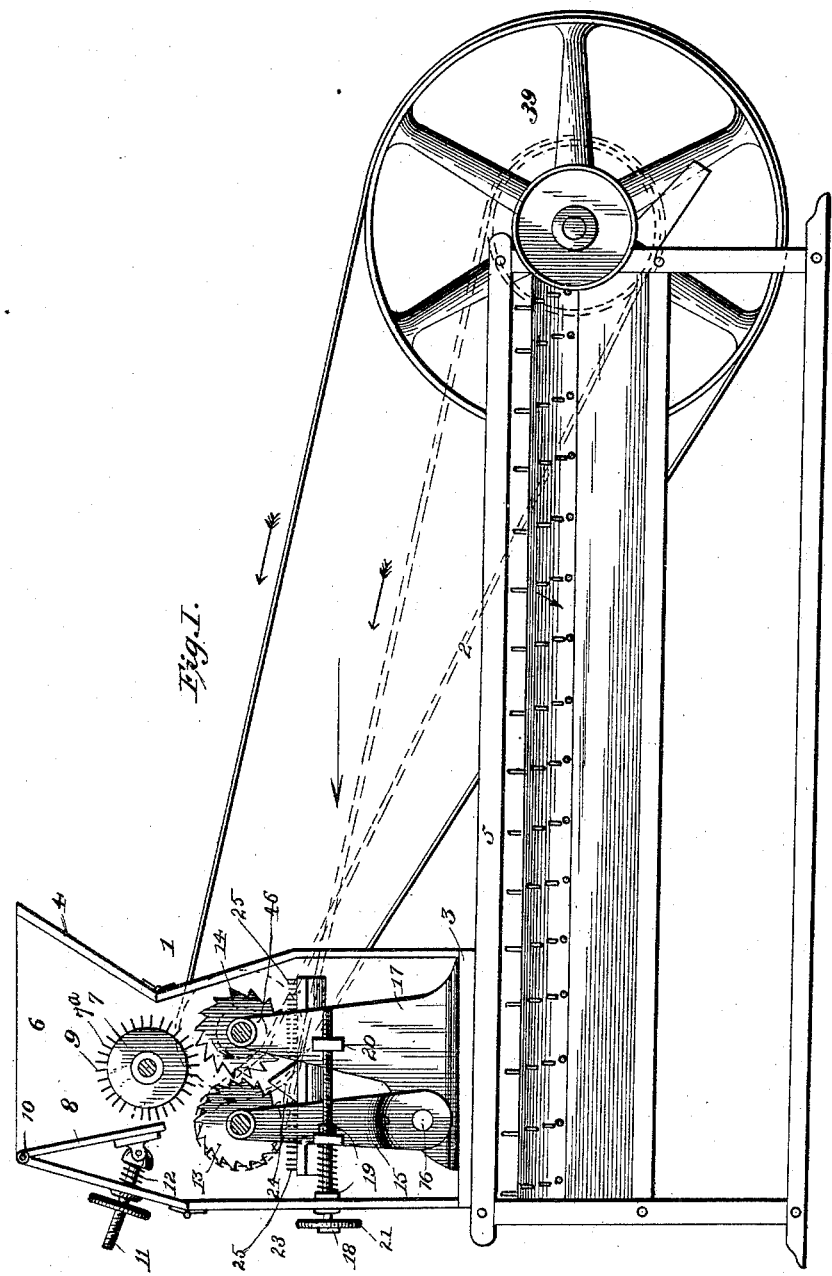
Witnesses:
Harry S. Rohrer.
Emma Arthur.
Inventor:
James J. Faulkner.
By Knight Bros.
Attorneys.

(No Model.) 2 Sheets—Sheet 2.
J. J. FAULKNER.
COTTON SEED HULLER.
No. 456,506. Patented July 21, 1891.
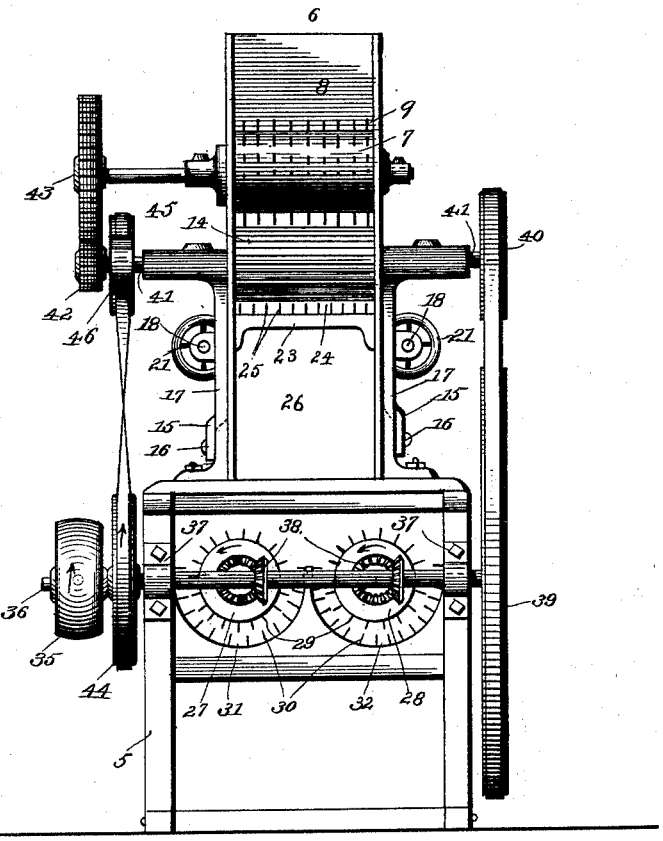
Fig. II.
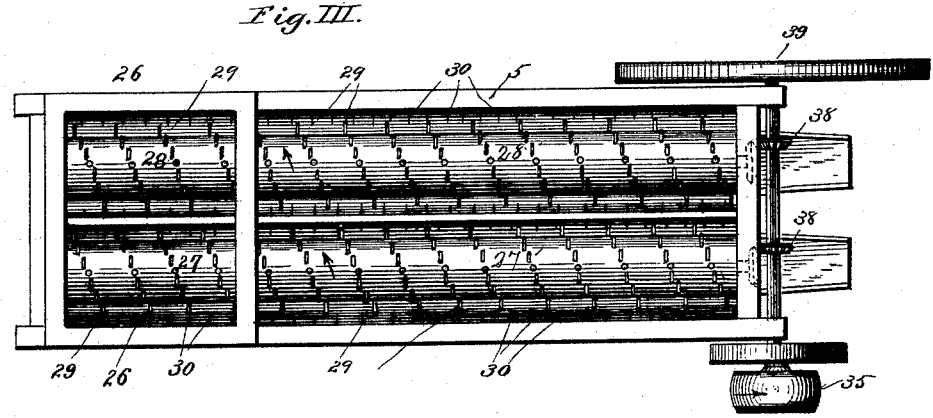
Fig. III.
Witnesses:
Harry S. Rohrer.
Emma Arthur.
Inventor:
James J. Faulkner.
By Knight Bros.
Attorneys.

UNITED STATES PATENT OFFICE.

JAMES JONES FAULKNER, OF MEMPHIS, TENNESSEE, ASSIGNOR TO THE NATIONAL COTTON SEED OIL AND HULLER COMPANY, OF SAME PLACE.

COTTON-SEED HULLER.

SPECIFICATION forming part of Letters Patent No. 456,506, dated July 21, 1891.

Application filed August 21, 1890. Serial No. 362,606. (No model.)

*To all whom it may concern:*

Be it known that I, JAMES JONES FAULKNER, a citizen of the United States, residing at Memphis, in the county of Shelby and State of Tennessee, have invented certain new and useful Improvements in Cotton-Seed Hullers, of which the following is a specification.

My invention relates to a device into which the cotton-seed may be fed, the same passing into the hopper and being fed from thence by means of a suitable feed-roller down upon a pair of hulling-rollers traveling at different rates of speed, after which the crushed hulls pass to a suitable separator consisting of a pair of agitators provided with spirally-arranged spikes.

My invention consists in certain features of novelty hereinafter particularly pointed out in the claims, being first fully described with reference to the accompanying drawings, in which—

Figure I is a side elevation of my complete device, one side of the housing being removed so as to expose the parts to view and showing the front driving connections in dotted lines. Fig. II is an end view looking in the direction of the arrow, Fig. I, and having the interior mechanism similarly exposed. Fig. III is a reduced section on the line III III, Fig. I, and this shows in plan the passage from the huller or breaking device and the separator to which said passage leads.

1 represents the breaking device, and 2 the separator, the former having a suitable base 3 resting upon the frame 5 of said separator.

6 represents a hopper, the throat or outlet of which is formed by a roller 7 and an adjustable valve-board 8. The roller 7 is provided with radial projections or studs 7ª, which serve to feed the seed downward, and the adjustable board 8 is mounted upon trunnions 10, and is controlled by means of a screw and hand wheel 11 and an interposed spring 12. The spring 12 is for the purpose of enabling the valve-board to limit the passage of the material with a yielding pressure. Passing from the hopper, the material drops between a pair of differential break-rolls 13 14, the former of which is mounted upon springing arms 15, having trunnions 16, and the latter mounted upon rigid vertical standards 17, mounted upon the base 3. The rolls are rendered relatively adjustable through the agency of screws 18, having bearing in the pivoted arms and confined therein by suitable shoulders 19, while the inner ends of said screws are secured in nuts 20. The screws are controlled by suitable hand-wheels 21, and to insure a separation of the rolls for the passage of any foreign matter springs 22 are interposed between the shoulders on the outer ends of the screws and the respective pivoted arms. Just beneath the crushing-rolls 13 14 is supported a plate 23, having an angular partition 24 and upwardly-extending pins or projections 25 covering the surface of the plate on opposite sides of the partition. The object of this plate is to produce a grating action on the hulls, and thus insure a more perfect detachment of the same from the seed. This plate may be made adjustable in any desired way or it may be fixed.

26 represents the passage from the huller to the separator. The separator consists of two parallel agitating-rolls 27 28, consisting of suitable bodies 27ª 28ª, with spirally-arranged pins or projections 29. The separating-rolls 27 28 have their spiral pins similarly arranged, so that while the rolls move the same way they will both have a tendency to feed the material toward the lower end of the machine. The machine may, if desired, be made slightly on an incline.

30 represents pins or projections projecting from the outer sides of the respective concave troughs 31 32, in which the separating-rolls are located. These pins 30 are located slightly above the horizontal diameter of the separating-rolls, and they operate on the hulls and materials, in connection with the rolls, to insure a better separation of the former. The bottom of the trough is perforated for the passage of hulls.

The machine is driven by the following mechanism:

35 is a drive-pulley mounted on a shaft 36, which shaft has bearings 37 on the frame of the separator and is provided with bevel-gearing 38, whereby it runs the two separating-rollers 27 28.

39 is a large pulley mounted on the opposite end of shaft 36, and this has suitable belt connection to pulley 40 on shaft 41 of the fast crushing-roll 14. On the opposite end of this shaft 41 is secured the pinion 42, which engages the large pinion 43 on the feed-roll 7.

44 represents a pulley on shaft 36, and which has belt connection to a pulley 45 on the slow crushing-roll. 46 is an idler on shaft 41 to cause the belt which drives pulley 45 to clear said shaft.

It will thus be seen that power transmitted to the pulley 35 will be transmitted to the respective parts, so that the separating-rolls will have a moderate rotation, as also will the feed-roll, while the hulling-rolls will rotate in the ratio of about three to one.

Having thus described my invention, the following is what I claim as new therein and desire to secure by Letters Patent:

1. In a cotton-seed huller, the combination, with the differential hulling-rolls, of the plate 23, located beneath said hulling-rolls and provided with the upwardly-extending pins or projections 25, and a suitable separator, all substantially as set forth.

2. In a cotton-seed huller, the combination, with crushing-rolls to which the material is first fed, of a hull-separator consisting of a pair of rolls provided with the spirally-arranged radial pins and the casing having the concave bottom perforated for the passage of hulls and provided with inwardly-projecting pins 30, said inwardly-projecting pins being adapted to operate, in connection with those on the rolls, for separating the hulls from the cotton, as explained.

3. In a cotton-seed huller, the combination of the feeding device consisting of the hopper provided with the feed-roller and the adjustable valve-board, said roller having suitable radial projections for engaging the material to be fed, a hulling device consisting of a pair of corrugated rollers, and the horizontal plate 23, provided with the upwardly-extending pins 25, one of said rolls being mounted in pivoted arms and provided with a controlling screw and spring, whereby it is held in position with a yielding pressure, and a separating device consisting of the pair of parallel separating-rolls having the oppositely-arranged spiral series of radial pins and the inwardly-extending rows of pins co-operating with the separating-rollers, said machine being provided with suitable drive and gear mechanism, all substantially as herein described.

JAMES JONES FAULKNER.

Witnesses:
BEN R. WILLIAMS,
F. P. POSTON.